INVENTOR.
JOHN C. SUTHERLAND
BY
*Burton & Parker*
ATTORNEYS

INVENTOR
JOHN C. SUTHERLAND
BY
*Burton & Parker*
ATTORNEYS

United States Patent Office 3,353,499
Patented Nov. 21, 1967

3,353,499
CONVEYOR TROLLEY
John C. Sutherland, Livonia, Mich., assignor to Taylor & Gaskin, Inc., Detroit, Mich., a corporation of Michigan
Filed May 11, 1965, Ser. No. 454,925
6 Claims. (Cl. 104—172)

ABSTRACT OF THE DISCLOSURE

A conveyor trolley for use in a conveyor system of the type commonly referred to as "Power and Free," the trolley including a trolley body having track-engaging means and a driving dog guidably supported on the body for vertically shiftable movement between driving and non-driving positions, and means for shifting the driving dog including an actuating lever projecting forwardly of the trolley for actuable engagement with a preceding trolley, the connection between the lever and driving dog being through a mechanical linkage that disengages the dog upon movement of the latter to non-driving position, the point of disengagement being intermediate opposite ends of lever movement to provide appreciable overtravel of the lever. The driving dog is completely disengaged from the linkage when in its non-driving position, enabling free removal of the dog from the trolley for repair or replacement.

---

This invention relates to conveyor systems, and more particularly to that type of system commonly known as "Power and Free" trolley conveyors.

In general, power and free trolley systems include a powered drive line having pusher members at spaced intervals therealong and a plurality of load carrying trolleys riding on a track, each of the trolleys being provided with a driving dog engageable with the pusher members of the drive line. The trolleys are propelled along their track by the powered drive line, and means are provided for disengaging the trolley dog and the pusher members so that the trolleys may be stopped along the track.

One advantage of such a power and free conveyor system is that the movement of a trolley or trolleys along the track may be easily interrupted at any desired location merely by providing means for disengaging the driving dog from the drive line pushers. A further advantage lies in the ability to accumulate a plurality of trolleys at a predetermined location such as a work station by providing a mechanism on each trolley for automatically disengaging its driving dog from the pusher member when the trolley approaches a preceding stationary trolley. Similarly, an accumulation of the trolleys may be restarted along the track simply by re-engaging the first trolley in the accumulation with the drive line, for as each trolley moves out of the group, the next following trolley is automatically picked up and moved along the track.

A general object is the provision of a trolley for a "power and free" trolley conveyor system which trolley is of simple yet efficient construction having all of the advantageous features associated with such systems while eliminating many of the disadvantages of prior art trolleys.

A more particular object is the provision of a trolley of the character described wherein the driving dog on the trolley is guidably supported thereon normally biased to an inoperative position and the actuating mechanism for the dog is normally biased to an operative position, whereby the driving dog is retained in operative or drive line engaging position by engagement of the actuating mechanism therewith, until such time as the mechanism is shifted, at which point the driving dog is released for movement to its normal inoperative position. With this construction, the driving dog remains in the inoperative position unless positively acted upon by the shifting of the actuating mechanism to urge the dog to operative position.

Another object is the provision of a trolley system of the character described wherein the driving dog of the trolley is actuated through linkage which positively engages the dog when in operative position, and which is disengaged from the dog in its inoperative position, permitting the dog to be removed from the assembly for repair or replacement without dismantling of the trolley, and providing a simple and easily accessible structure allowing access for lubrication of moving parts.

A particular feature of the trolley construction is the provision of driving dog actuating means having built-in overtravel, which construction eliminates the need for providing mechanism for establishing a predetermined relative position between two adjacent trolleys being accumulated on the trolley track. In previous trolley constructions, means was necessarily provided to establish a relative position between the trolleys to insure that the driving dog of a following trolley would be disengaged from the drive line upon abutment with a preceding trolley. The trolley disclosed herein, in addition to virtually eliminating the possibility of improper driving dog actuation, results in the provision of a lighter, yet sturdier, trolley.

Other objects, advantages and meritorious features will more fully appear from the following specification, claims and accompanying drawings, wherein:

Figure 1:
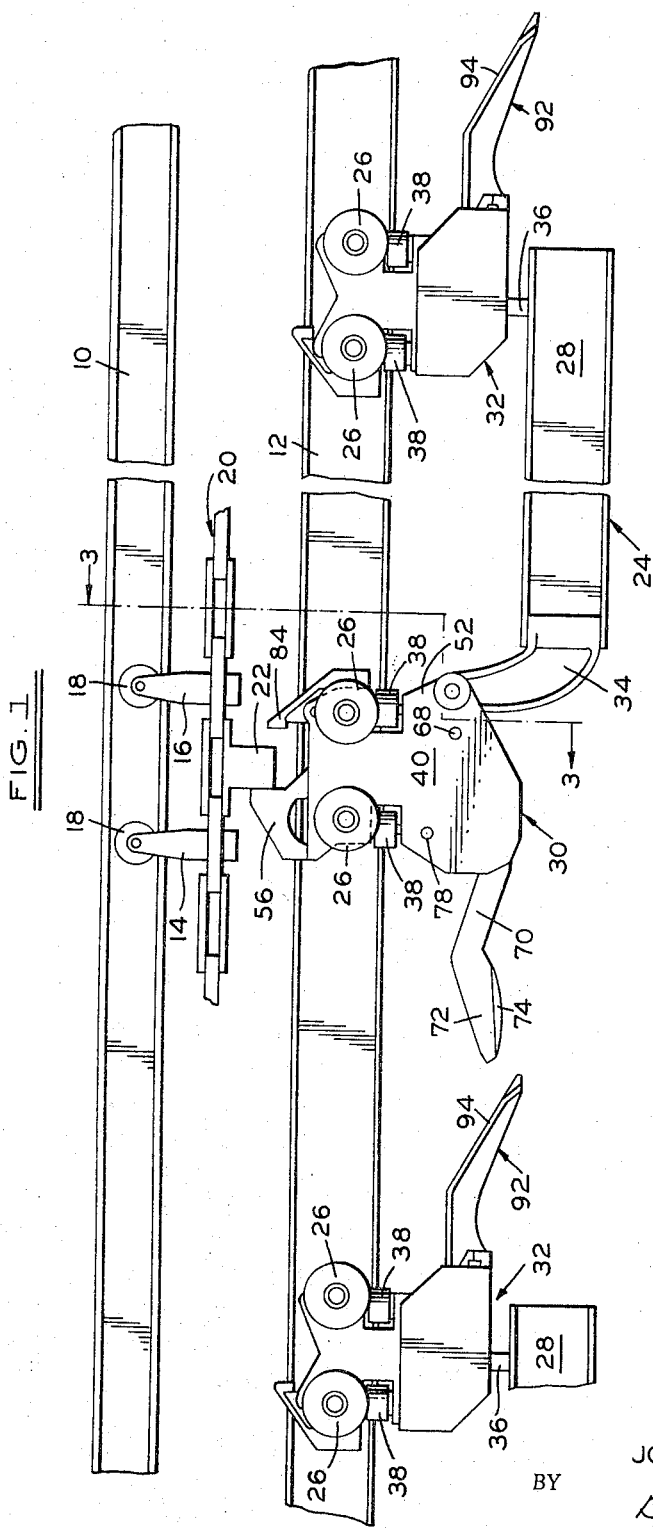
FIG. 1 is a side elevation of a portion of a trolley conveyor system showing a trolley embodying the invention.
Figure 3:
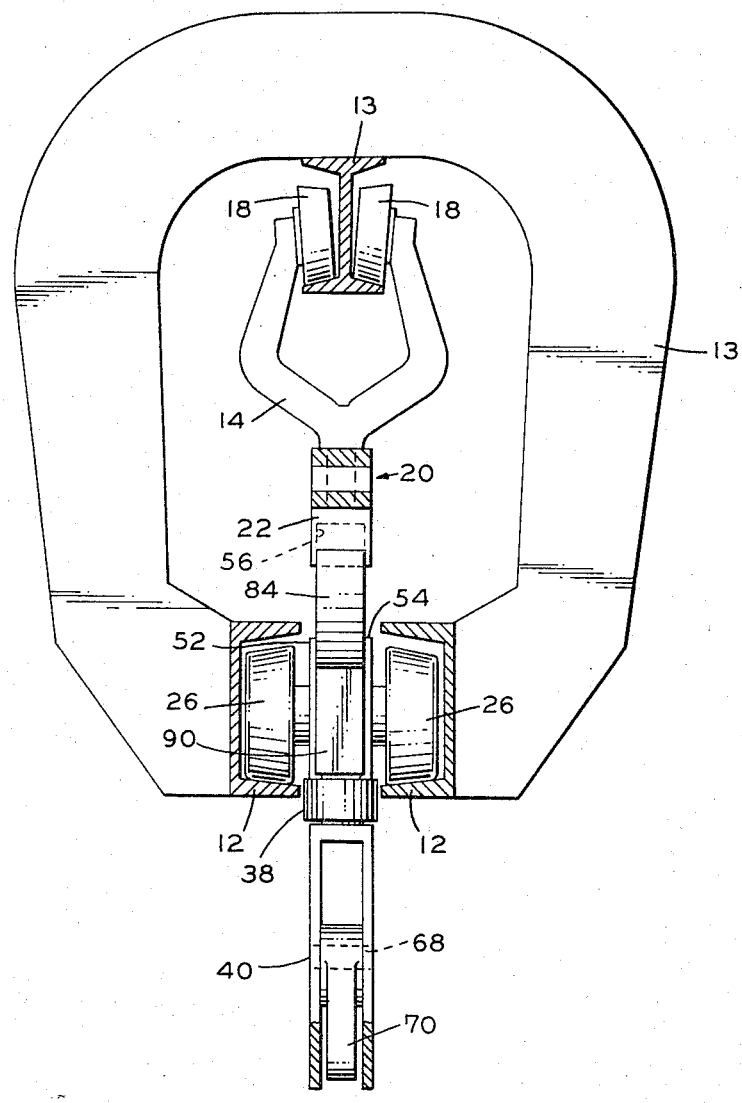
FIG. 3 is an enlarged cross section taken on line 3—3 of FIG. 1.

Referring now more particularly to the drawings, FIG. 1 shows a trolley conveyor system of the type generally referred to as a "power and free" system comprising a pair of longitudinally extending, vertically spaced trolley tracks 10 and 12, of which the upper tracks may be I-shaped in cross section. The lower track 12 comprises two channel-shaped members arranged in confronting relation as shown in FIG. 3. The track 12 is commonly referred to as the "free line." Both tracks 10 and 12 are secured as by welding to hangers of inverted U-shape, one of which is shown at 13 in FIG. 3. Trolleys such as shown at 14 and 16 are suspended from track 10 by wheels 18 engaging the track, and the trolleys carry a drive line or chain 20 having pusher members depending therefrom at spaced intervals, one of the pusher members being shown at 22 in FIG. 1. Such structure is standard and well known to those skilled in the art. The drive line is continuously driven by suitable motive means such as an electric motor or the like (not shown).

Riding along the lower track 12 are a plurality of "power and free" trolleys, as shown at 24 in FIG. 1. These trolleys are suspended from track 12 on wheels 26 rollably engaging the lower track flange, and are provided with a load carrying member 28 from which a load may be hung in a manner well known in the art. As shown, each trolley 24 may comprise two units 30 and 32 coupled together through the load carrying member 28 and connectors 34 and 36. Rollers 38 mounted on vertical axes are provided on the trolley units positioned in between the inwardly extending lower flanges of tracks 12, as shown in FIG. 3, to insure smooth travel of the trolley along the track, especially when negotiating curves in the track. The rollers 38 lie normally spaced slightly from the track flanges, and engage the flange upon any slight lateral movement of the trolley, preventing the trolley parts from scraping along the track. The direction of movement is from right to left as shown in both FIG. 1 and FIG. 2.

Figure 2:
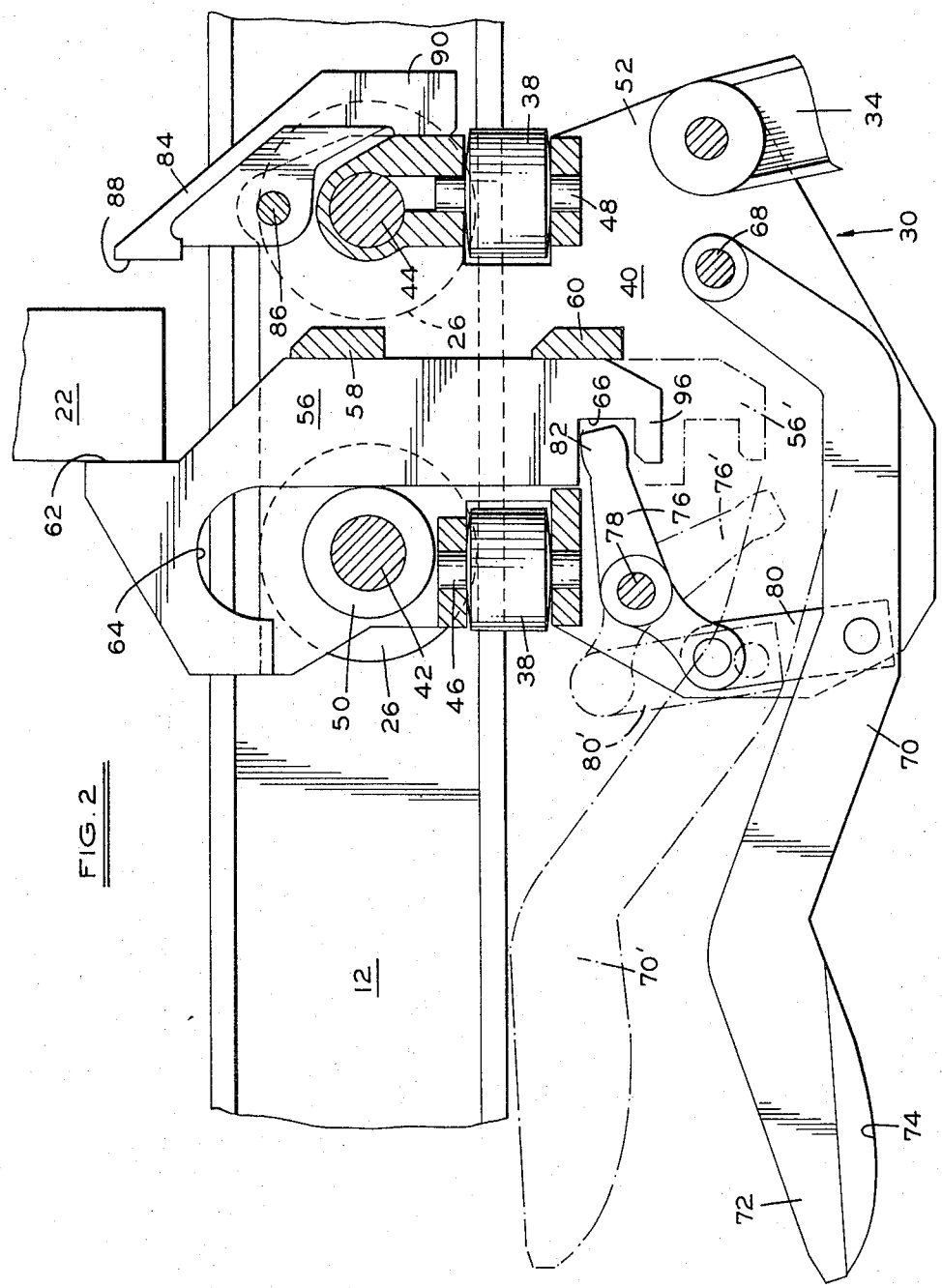
FIG. 2 is an enlarged side elevation, partly in section, showing the operative structure of the trolley in FIG. 1.

Referring particularly to FIGS. 2 and 3, the trolley unit 30 containing the operative mechanism, includes an integral trolley body 40 having a pair of horizontal shafts 42 and 44 rotatably mounted therein, and a pair of vertical shafts 46 and 48 likewise rotatably mounted. On opposite ends of each shaft 42 and 44 are carried the wheels 26, while shafts 46 and 48 carry rollers 38. Shaft 42 also carries a roller 50 intermediate the two wheels 26, which will be described in detail hereinafter. Supported on the trolley body 40 between the upper ends of two plate-like portions 52 and 54 thereof is a driving dog 56 which is freely slidably movable with respect to the body 40. A pair of guide blocks 58 and 60 extend between portions 52 and 54 to guide dog 56 in its movement.

Driving dog 56 is provided at its upper end with a vertical, rearwardly facing drive face 62 engageable with a pusher member 22 when the dog is in its upper or operative position as clearly shown in FIG. 1. The dog also exhibits a semi-circular recess 64 conforming generally to the outer contour of roller 50, and the dog is supported on the roller when in its lower or inoperative position as hereinafter described. Adjacent its lower end dog 56 is provided with a laterally opening cut-out 66 as shown into which projects a portion of the actuating mechanism to be described.

Pivotally mounted on an axis 68 between members 52 and 54 is an actuating lever 70 which projects forwardly beyond the trolley unit as shown, and having an outer end portion 72 defining a curved underside 74 for engagement with the operating means of a preceding trolley as hereinafter described. A link 76 is pivotally secured to the trolley frame on axis 78, and a second link 80 extends between members 70 and 76 and is pivotally connected to each of them at its opposite ends. Link 76 projects toward dog 56 and terminates in an end portion 82 positioned in cut-out 66 and engaging against the dog when the latter is in its raised or operative position shown in full lines in FIG. 2. Also mounted on trolley body 40 is a second dog 84, commonly called a backup dog, which is secured for pivotal movement on axis 86. Dog 84 has a driving face 88 thereon and a counterbalance portion 90 normally biasing the dog to the position shown in the drawings, it being retained by abutment of portion 90 against the trolley body 40.

Referring to FIG. 1, the purpose of dog 84 will be apparent. If track 12 has a downwardly inclined portion, or if some external force acts against a trolley in its direction of movement, to accelerate the trolley, such may tend to move faster than the speed of the drive line 20, in which case the trolley would become disengaged from the pusher 22. If this occurs, pusher 22 is contacted by dog 84, and the trolley is prevented from "running away" along the track.

One the rear unit 32 of each trolley 24 there is secured an operating member or arm 92 having an upper rearwardly sloping surface 94 projecting beyond the trolley, as shown in FIG. 1. In operation, the arm 92 serves to shift the actuating mechanism of a following trolley as described herebelow to accumulate a group of trolleys at a predetermined location along the trolley line.

When it is desired to accumulate a group of the trolleys 24, the leading trolley of the group is stopped along track 12 and following trolleys are automatically disengaged and accumulate as follows. The driving dog 56 of the lead trolley may be disengaged from the pusher member 22 of drive line 20 in various ways, the simplest of which is to manually raise its actuating member 70, which uncouples the dog from the pusher in the same fashion as is to be described herebelow for the following trolley.

Once the lead trolley has been stopped, by whatever means, the following adjacent trolley will continue to be driven along the track 12 until the surface 74 on member 70 of the following trolley contacts inclined surface 94 on arm 92 of the lead trolley. Member 70 is thereby cammed up along arm 92, pivoting the member 70 counterclockwise about its axis 68 (FIG. 2). This in turn pivots link 76 clockwise about its axis 78, shifting portion 82 against projection 96 on dog 56 and pulling the dog 56 downwardly out of engagement with pusher member 22. As the following trolley is now disconnected from the drive line 20, it will come to a stop behind the lead trolley in abutment therewith. Each successive trolley approaching along the conveyor will be similarly stopped by engagement of its actuating member 70 with the operating arm 92 of the preceding trolley in like fashion. When stopped the member 70, link 76, link 80 and driving dog 56 will be in the position shown in phantom by primed reference numerals in FIG. 2.

Because of the frictional force present between dog 56 and pusher 22 resisting gravity movement of the dog to its lowered or inoperative position, the link 76 actually pulls the dog down by engagement of link portion 82 and dog portion 96. However, only about one-half of the available travel of the actuating mechanism is required to disengage the driving dog, and therefore the further movement of the actuating mechanism is overtravel, and the link 76 is completely disengaged from the dog, as can be seen by the spaced relationship therebetween indicated at 76' and 56' in FIG. 2. If through extended service the driving dog becomes damaged or broken, it can be easily removed for repair or replacement merely by lifting it out of the trolley body 40 while retaining the actuating mechanism in the position shown in phantom in FIG. 2.

In addition, this overtravel insures that the dog will not be accidentally shifted to its operative position. Assume for example that the trolley of FIG. 2 has been stopped in an accumulation along the conveyor, with similar trolleys both in front of and behind it. If the dog 56 of such trolley were inadvertently engaged with a pusher 22 of drive line 20 damage to several trolleys could result. To prevent such an occurrence, the actuating mechanism is designed to permit substantial movement without corresponding movement of the driving dog. As seen in phantom in FIG. 2, if the trolley is jostled or rocked, causing member 70' to shift accidentally, link 76' will not engage the cut-out in dog 56' to begin shifting the dog until it has travelled a substantial distance.

When it is desired to again start the trolleys in their travel, the lead trolley is moved along track 12. When this occurs, member 70 of the following trolley rides down the inclined cam surface 94 of arm 92, pivoting member 70 and link 76 counterclockwise, engaging link portion 82 with the driving dog 56 to shift the dog up to its operative position. Upon the approach of the next pusher 22, such strikes dog 84, pivoting the dog, and the pusher bypasses dog 84 and engages dog 56 to propel the trolley along the track.

What is claimed is:

1. A trolley for a conveyor system including a trolley track and powered drive means having pusher members disposed in spaced apart relation therealong, comprising a trolley body provided with track-engaging means supporting the trolley for movement along the track, a driving dog supported for vertically shiftable movement on the body between an operative position in the path of said pusher members and an inoperative position out of the path of said members, means coupled to said driving dog for shifting the same and including a vertically swingable actuating member projecting forwardly of the trolley for engagement with a preceding trolley on the track, and a link operably coupled to said member engaging said driving dog when the latter is in its operative position to positively shift the dog to its inoperative position upon movement of said actuating member, said link being disengaged from the driving dog when the dog reaches its inoperative position.

2. The invention as defined in claim 1 characterized in that said link and said driving dog are completely disengaged upon movement of the dog to its inoperative position, said trolley body having means for supporting the dog when in said inoperative position and guide means for guiding the dog in its shiftable movement, with said driving dog being freely removable from the trolley when disengaged from said link.

3. The invention as defined in claim 1 characterized in that said driving dog is gravity biased to its inoperative position and said means for shifting the driving dog is gravity biased to an operative position overcoming the bias of the driving dog to normally maintain the dog in its operative position.

4. The invention as defined in claim 1 characterized in that said actuating member is pivotally mounted on said trolley body for swingable movement, and said link is pivotally mounted on the body for swingable movement, said member and link having a dimensional relationship such that movement of the actuating member through a predetermined arc shifts said link through a greater arc, whereby the link shifts said driving dog to its inoperative position during an initial portion of member movement.

5. A trolley for a conveyor system including a trolley track and powered drive means having pusher dogs disposed in spaced apart relation therealong comprising: a trolley body having a plurality of track-engaging wheels supporting the trolley for movement along the track; a rigid driving dog supported on said body for vertically shiftable movement between an operative position disposing its upper end in alignment with said pusher dogs and an inoperative position spaced below said dogs; means on the body for guiding the driving dog in its movement and including a stop for supporting the dog when in inoperative position; means mounted on the trolley body for shifting said driving dog and including an elongate actuating lever pivotally supported adjacent one end on the trolley body for vertically swingable movement and projecting forwardly of the body for actuable engagement with a preceding trolley on the track, a first link pivotally mounted on the trolley body for engaging said driving dog, and a second link interconnecting said lever and said first link, said links and lever having a dimensional relationship such that movement of the lever projecting end through a given arc imparts movement to the first link through a greater arc, and the shiftable movement of the driving dog being less than the movement of said first link, whereby only partial travel of said lever is operable to shift the dog to its inoperative position; said first link being positively engaged with said driving dog during shiftable movement of the latter between operative and inoperative positions, and disengaging said dog during overtravel movement of the lever and links.

6. The invention as defined in claim 5 characterized in that said means mounted on the trolley body for shifting said driving dog is biased to an operative position engaging said first link with the dog and retaining the driving in its operative position.

References Cited
UNITED STATES PATENTS

| | | | |
|---|---|---|---|
| 2,883,942 | 4/1959 | Johnson | 104—172 |
| 3,195,474 | 7/1965 | Dehne | 104—172 |
| 3,196,805 | 7/1965 | Bishop | 104—172 |
| 3,242,805 | 3/1966 | Orwin | 104—178 |

ARTHUR L. LA POINT, *Primary Examiner.*

D. F. WORTH, *Assistant Examiner.*